Aug. 3, 1937. L. P. WINBY ET AL 2,088,890
CLIP TYPE FASTENING DEVICE
Filed Jan. 22, 1936   3 Sheets-Sheet 1

INVENTORS
LEWIS P. WINBY
GEO. F.C. CASWELL

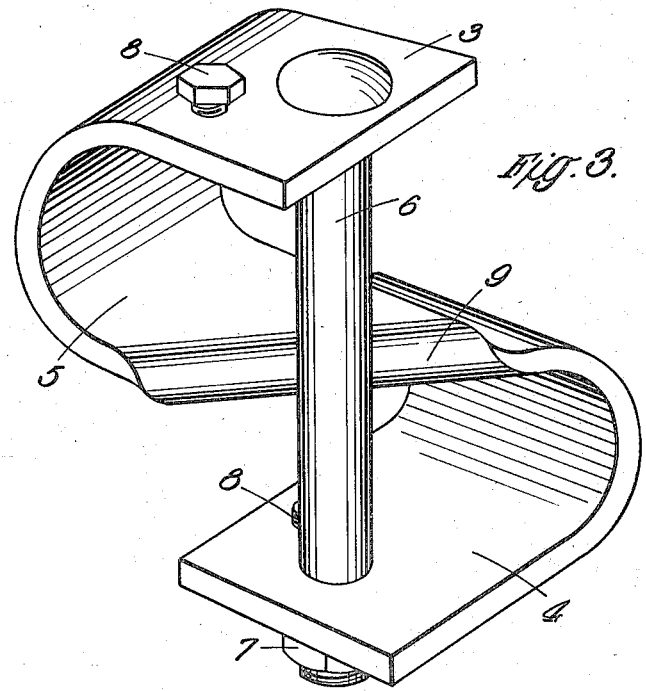
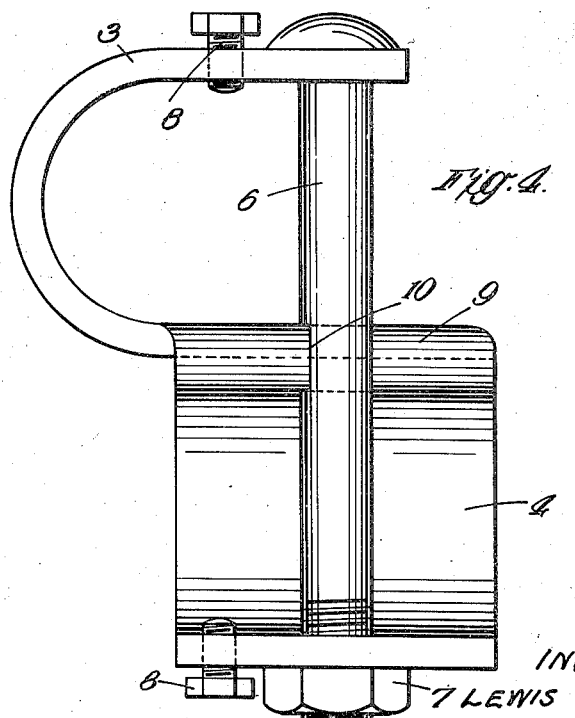

Aug. 3, 1937. L. P. WINBY ET AL 2,088,890
CLIP TYPE FASTENING DEVICE
Filed Jan. 22, 1936   3 Sheets-Sheet 3

INVENTORS
LEWIS P. WINBY
GEO. F. C. CASWELL

Patented Aug. 3, 1937

2,088,890

UNITED STATES PATENT OFFICE 2,088,890

CLIP TYPE FASTENING DEVICE

Lewis Phillips Winby and George Frederick Charles Caswell, London, England, assignors to Mills Scaffold Company Limited, London, England, a British company Application January 22, 1936, Serial No. 60,320
In Great Britain March 19, 1935

6 Claims. (Cl. 189—36)

This invention relates to clip type fastening devices suitable for connecting together tubular or other structural members such as for example tubular scaffold members, one member of which is arranged transversely of the other or diagonally or disposed parallel therewith. The invention is however particularly applicable where it is desired to connect together two members arranged at right angles to one another.

Scaffold clips have already been proposed which included two U-shaped members of strip metal pivotally connected together back to back and each adapted to embrace one of the scaffold members, the extremities of each respective U-shaped arm being brought firmly into engagement with their associated scaffold member by a connecting member one of the connecting members being in the form of a bolt. A scaffolding clip has also been proposed including two members of substantially U-shape internally screw-threaded for the reception of a securing bolt adapted to draw the members firmly into engagement with the scaffold members.

A clip type fastening device according to the invention for the purposes specified comprises a plurality of integrally formed or connected arms each bent or otherwise formed to substantially U-shape to embrace partially one of the members to be connected together and to provide an intermediate portion or portions lying between said members and a bolt or other securing device connecting all of said arms together and adapted to contract said arms simultaneously into firm engagement with the connected members.

By the phrase "other securing device" is meant a member or device connecting all of the arms together and incorporating a movable member such as a cam, eccentric or alternatively a screw threaded member adapted when operated to cause all the arms to be moved simultaneously into firm engagement with the connected members.

In order that the said invention may be clearly understood and readily carried into effect, the same will now be described more fully with reference to the accompanying drawings which illustrate a number of embodiments of the invention wherein Figures 1 and 2 are respectively a perspective view and end elevation of one form of clip according to the invention applied to two tubular scaffold members.

Figures 3 and 4 are respectively views similar to Figures 1 and 2 but illustrating a modified form of clip.

In the constructions illustrated the clips shown are intended for connecting together at right angles two tubular or other structural members such as for example two tubular scaffold members 1 and 2.

Figure 1:
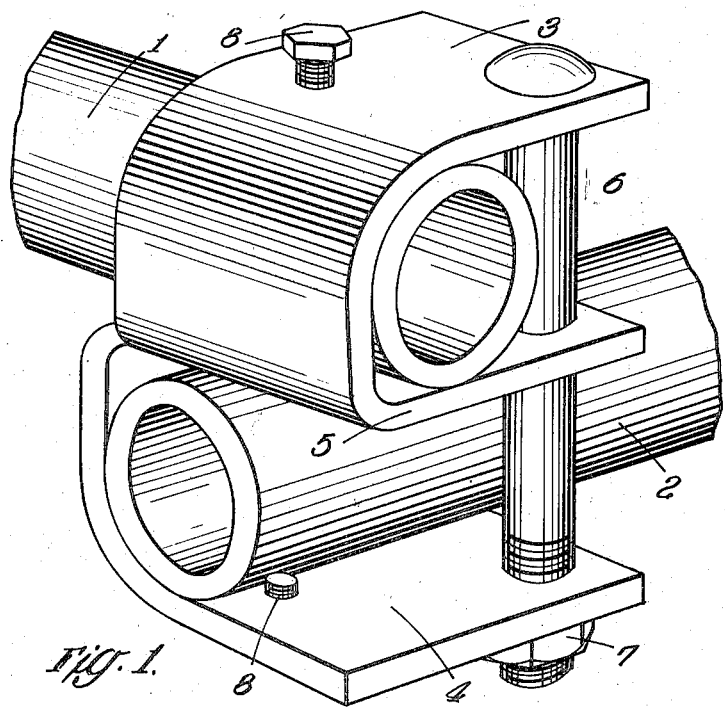
Figure 2:
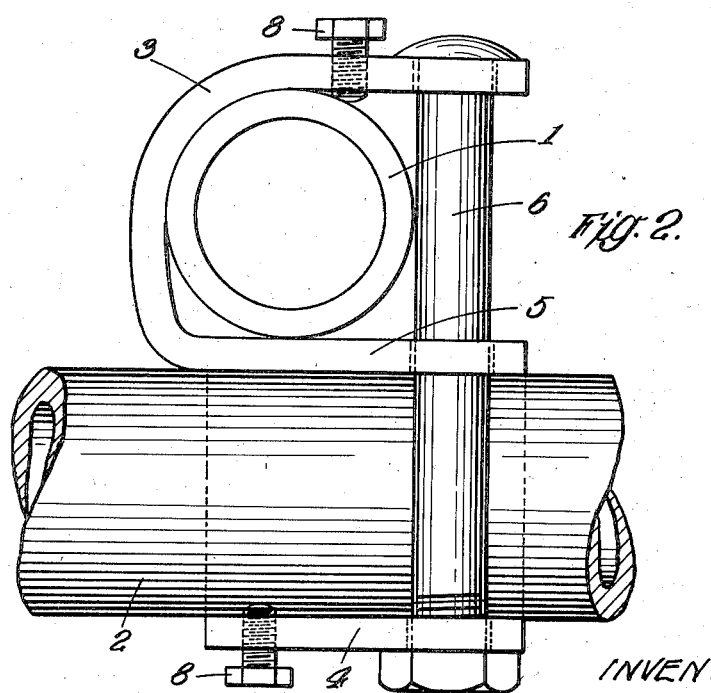

The clip shown in Figures 1 and 2 is formed from a single piece of sheet metal having two integrally formed arms 3 and 4 arranged at right angles the arms being connected by a common integrally formed portion 5, the clip blank being of substantially L-shape. The arms 3 and 4 are bent in planes disposed at right angles, the arm 3 being bent in an upward direction and the remaining arm 4 downwardly. The arms when bent each embrace partially one of the members to be connected together, each arm being of substantially U-shape. In order to secure the clip in its operative position on the members to be connected together a bolt 6 is passed through the clip, the bolt passing through a hole provided in each of the arms 3 and 4 near their extremities and through a further hole provided in the intermediate part 5. The bolt is provided with a nut 7 which on being tightened serves to draw the two arms of the clip towards each other and firmly into engagement with the tubular members, the tubular members being thereby gripped between the intermediate part 5 and the arms 3 and 4. By arranging the bolt relatively closely adjacent the tubular members and by making the hole in the intermediate part of the clip relatively larger in diameter than the bolt it will be found on tightening the nut that the arms of the clip will be drawn towards each other slightly thereby causing the bolt to be moved laterally and into firm engagement with the adjacent surfaces of the tubular members, the bolt thereby assisting directly in maintaining the tubular members in their correct position.

In order to maintain the clip in position upon the members prior to inserting the bolt, one or both arms may be provided with a threaded hole for the reception of a set screw 8 or similar member adapted to bear upon the adjacent tubular member, the positions of the set screws being such that the clip cannot be removed without first slackening the set screws.

In the modified construction of clip shown by Figures 3 and 4 the clip is again constructed from a single piece of metal, in this case an ordinary length of strip metal and includes two arms 3 and 4 which are bent into substantially U-shape the arms being bent in planes lying at right angles to each other. The intermediate part 5 of the clip is in this case formed by folding the clip midway of its length at an angle of 45° to its longitudinal edges as at 9 the folded over parts lying closely adjacent each other in superimposed relationship and forming an intermediate portion of double thickness.

In the case of the tubular members being required to lie at any angle other than 90° the angle of the fold may be suitably varied. The clip is provided with a bolt 6 passing through holes formed in the clip arms, the bolt carrying a nut 7 as in the previously described construction. The intermediate part 5 may be notched or recessed as at 10 the recess being preferably of substantially semi-circular shape, the bolt when in position engaging the walls of the said recess and thereby serving to locate the two arms of the clip relatively to the intermediate portion.

Figures 5, 6:
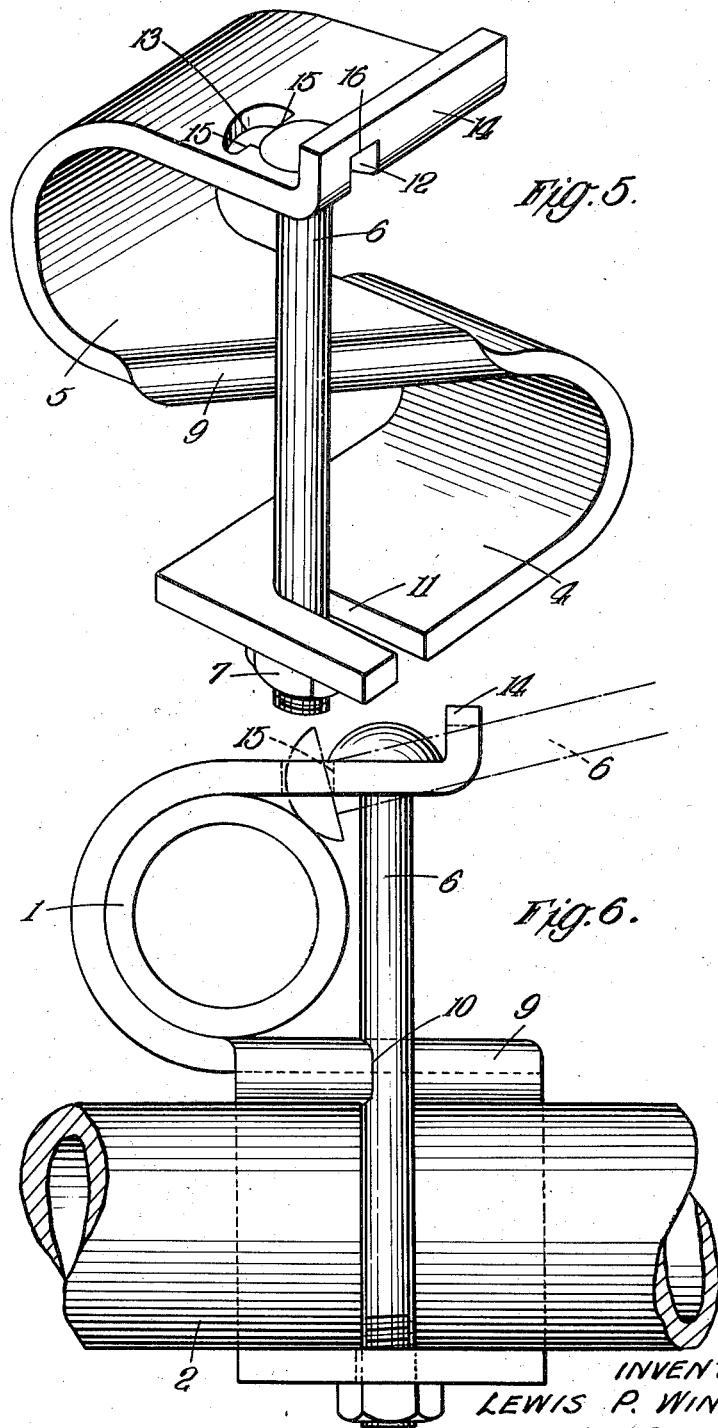
Figures 5 and 6 are similar views illustrating a further modified construction.

In the construction shown by Figures 5 and 6 which has been evolved primarily with the object of providing a clip wherein it is not necessary to remove the bolt and its associated nut in order to mount the clip in position, the clip is of the same general shape as that shown in Figures 3 and 4. In this case however the bolt passes through slots formed in the clip arms, the slot 11 in the lower arm being open at one end. The slot 12 provided in the remaining arm is closed at its ends and terminates at one end in an enlarged portion 13 of approximately semi-circular shape and of sufficient size to receive the bolt head, the main straight portion of the slot extending into an upwardly turned lip 14 on the extremity of the upper arm. The arrangement is such that the bolt may be moved clear of the lower open ended slot when placing the clip in position and by a combined lateral and turning movement, moved into a position in which the bolt head enters the enlarged part 13 of the slot 12, in which position the clip may be placed upon the upper of the two tubular members. With this arrangement the set screws used for securing the clip temporarily in position may be dispensed with, the bolt itself being used for locking the clip temporarily in position upon the upper of the two members to be joined. This object is attained by pivoting the bolt still further in an upward direction into the position shown by chain dotted lines in Figure 6 the under surface of the bolt head in that position engaging the walls 15 of the enlarged part 13 of the slot. The shank of the bolt is thereby brought into engagement with the extremity 16 of the straight portion of the slot 12 that part constituting a fulcrum about which the bolt pivots. The curved surface of the bolt head is thus brought firmly into engagement with the tubular member 1 and is wedged firmly between that member and the walls 15 of the part 13 of the slot, the clip being thereby held temporarily in position. Upon the lower tubular member having been placed in position the bolt may be moved into the position shown by full lines and the nut tightened the periphery of the bolt head in that position engaging the adjacent surface of the upstanding lip 14. In order to prevent the nut being removed unnecessarily and possibly lost the end of the bolt may be burred over. With this arrangement the set-screws are found in practice to be unnecessary the cost of manufacture of the clip being thereby reduced.

Although as in the three forms of clip hereinbefore described the arms are constructed integrally from sheet or strip metal bent to the appropriate form, the clip may be for example in the form of a malleable casting or stamping. Alternatively the arms may be constructed separately and welded, riveted, folded over or otherwise connected together. In the case of the construction shown by Figures 3 to 6 the connection may be of a non-rigid character so as to enable the two arms of the clip to be turned relatively to each other about their point of connection, (in these cases the securing bolt) so as to enable the clip to be used for connecting two members arranged in either parallel relationship or at any desired angle. In the case of Figures 1 and 2, if it is desired to construct the two arms separately, the intermediate portion consists of two thicknesses of metal the two parts of the clip being pivotally connected by means of the securing bolt to enable the parts to be moved angularly relatively to each other.

In any of the constructions shown by Figures 1-4 hereinbefore described the securing bolt may pass through slots either open or closed at the end and if desired the slots in one or in each clip-arm may be of substantially keyhole shape the bolt head and nut being provided with a projection larger in diameter than the bolt shank and adapted to enter the larger portion of the slot. With this arrangement the bolt will be held firmly in position when the nut has been tightened but may easily be removed by a lateral movement merely by slackening the nut and disengaging the nut and bolt head from the larger portions of the slots. Alternatively the bolt may be in the form of an eye bolt pivotally connected to one arm and adapted to enter a slot in the remaining arm.

In any of the constructions hereinbefore described the clip instead of having two arms only may be provided with more than two arms in which case three or more members may be connected together by means of a single clip.

What we claim and desire to secure by Letters Patent of the United States is:—

1. A clip for connecting together superposed crossed members, said clip comprising a pair of substantially U-shaped formations disposed at substantially right angles to each other and each including a pair of arms, the entire clip comprising three arms of which one is common to both U-shaped formations, and a single bolt extending through the two outermost arms of the respective formations for drawing said outermost arms toward the intermediate arm.

2. A one-piece sheet metal clip for connecting together superposed crossed members, said clip comprising a pair of substantially U-shaped formations disposed at substantially right angles to each other and each including a pair of arms, the entire clip comprising three arms of which one is common to both U-shaped formations, and a single bolt extending through the two outermost arms of the respective formations for drawing said outermost arms toward the intermediate arm.

3. A one-piece sheet metal clip, as set forth in claim 2 in which the sheet metal blank from which the clip is formed is of L-shape.

4. A one-piece sheet metal clip as set forth in claim 1 in which the sheet metal blank from which the clip is formed is straight and of uniform width throughout its length.

5. The method of forming a straight strip of sheet metal into a clip having a pair of substantially U-shaped formations disposed at substantially right angles to each other, which consists in bending the strip intermediate its ends diagonally upon itself to dispose its respective end portions in substantially right angular relationship to each other, and then bending the respective end portions oppositely with respect to each other into substantially U-shape.

6. A clip for connecting together superposed crossed members, said clip being formed from a straight strip of sheet metal bent intermediate its ends diagonally upon itself and having its respective end portions bent oppositely with respect to each other into substantially U-shape whereby the clip comprises a pair of substantially U-shaped formations disposed at substantially right angles to each other and each including two arms of which one is common to both U-shaped formations, the outermost arm of one of said formations having a terminal outwardly directed flange and a slot, said slot extending into said flange and having an enlarged inner end portion to permit the insertion of a headed bolt therethrough, the outermost arm of the other formation having a bolt accommodating slot opening through a side edge thereof, and a bolt extending through the slots in said arms for drawing said arms inwardly toward the intermediate arm.

LEWIS PHILLIPS WINBY.
GEORGE FREDERICK CHARLES CASWELL.